(No Model.)

V. VIDAL, Jr.

FISHING FLOAT AND METHOD OF MANUFACTURING THE SAME.

No. 290,154. Patented Dec. 11, 1883.

Witnesses
N. E. Poulter
J. W. Knott

Inventor
Victor Vidal fils
p. Henry Orth
his atty

UNITED STATES PATENT OFFICE.

VICTOR VIDAL, JR., OF PIGNANS, FRANCE.

FISHING-FLOAT AND METHOD OF MANUFACTURING THE SAME.

SPECIFICATION forming part of Letters Patent No. 290,154, dated December 11, 1883.

Application filed July 5, 1883. (No model.) Patented in France March 31, 1883.

*To all whom it may concern:*

Be it known that I, VICTOR VIDAL, Jr., a citizen of the French Republic, residing at Pignans, in the French Republic, have invented certain new and useful Improvements in Manufacture of Floats; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention is to avoid, as much as possible, the waste of cork in the manufacture of floats for seines and other fishing apparatus, or for other purposes, as hereinafter fully described, and as shown in the accompanying drawings, in which—

Figure 2:
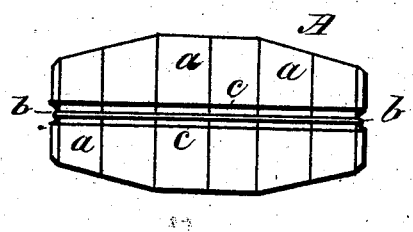
Figure 3:
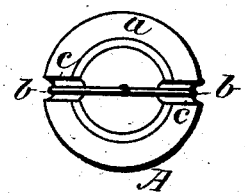
Figure 4:
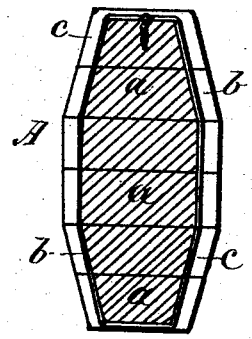
Figure 1:

Figure 1 is a perspective view, Fig. 2 an elevation, Fig. 3 an end view, and Fig. 4 a vertical transverse section, of a float constructed according to my invention.

In the manufacture of float from cork there is more or less waste, by reason of said floats having heretofore been made of a single piece of material, such waste being increased when the floats are of a given form—such as conoidal, oval, or cylindrical. To avoid this waste I use, according to the size of the float A, slabs, plates, or small pieces of cork $a$, from which I build a float of approximately the shape required without cementing or otherwise gluing the several pieces, plates, or slabs together, though this may be done, if desired. When the float is built up, as described, (which may be done in a suitable matrix or form,) I subject the same to compression by any of the well-known means employed for such purposes, and tie the pieces together by means of a cord or wire, $b$, preferably the latter, as shown. When so tied, the pressure upon the compound float is removed. The ties will then sink more or less into the cork and form grooves $c$, for the reception of a cord or other means of attaching the floats to the net or other object to be buoyed, after which the float may be cut, turned, or otherwise fashioned into the final shape it is to have.

Instead of forming the grooves by the expansion of the cork along the ties, I prefer cutting grooves $c$, for the reception of the tie wire or wires $b$ and the cord or other means for attaching the float to the object to be buoyed, such grooves being cut while the float is in a compressed state by any suitable means.

Having thus described my invention, what I claim is—

1. The method of constructing floats for fishing-tackle and utilizing refuse cork, which consists in subjecting scraps or pieces of cork to pressure, and tying, while subjected to pressure, to form a practically homogeneous mass, and finally shaping the float, as described.

2. A float for fishing-tackle, composed of scraps or pieces of cork having grooves $c$, in combination with the tie $b$, all arranged and constructed substantially as and for the purposes specified.

In testimony that I claim the foregoing I have hereunto set my hand this 30th day of May, 1883.

VICTOR VIDAL, JR.

Witnesses:
GEORGE WALKER,
E. P. MACLEAN.